United States Patent [19]
Monroe et al.

[11] Patent Number: 6,078,607
[45] Date of Patent: Jun. 20, 2000

[54] SYNCHRONIZATION CODES FOR USE IN COMMUNICATION

[75] Inventors: Robert L. Monroe; Timothy J. Lunn, both of Colorado Springs, Colo.

[73] Assignee: Omnipont Corporation, Bethesda, Md.

[21] Appl. No.: 09/131,894

[22] Filed: Aug. 10, 1998

[51] Int. Cl.[7] .............................. H04K 1/00; H04L 25/38; H04J 3/06

[52] U.S. Cl. ......................... 375/145; 375/367; 375/368; 370/350

[58] Field of Search ...................................... 375/134, 136, 375/137, 140, 141, 145, 367, 368; 370/350, 503

[56] References Cited

U.S. PATENT DOCUMENTS

| | | | |
|---|---|---|---|
| 5,093,841 | 3/1992 | Vancraeynest | 375/130 |
| 5,289,498 | 2/1994 | Hurlbut et al. | 375/130 |
| 5,822,359 | 10/1998 | Bruckert et al. | 375/367 |

*Primary Examiner*—Stephen Chin
*Assistant Examiner*—Albert Park
*Attorney, Agent, or Firm*—Lyon & Lyon LLP

[57] ABSTRACT

In a first embodiment of the invention, two sets of seven PN-sequences of length 128 are provided having favorable correlation properties for use as a preamble or midamble synchronization code. At the receiver a processor may be used to detect the code. In another aspect of the invention, a communication system using a synchronization code selected from sets of provided codes is claimed where the synchronization code may help to minimize possible misidentification of noise or interference by assisting in the detection of the start of a designated burst. The synchronization codes and their means for detection may be employed in various communication systems.

23 Claims, 4 Drawing Sheets

SYNCHRONIZATION CODES FOR USE IN COMMUNICATION

FIELD OF THE INVENTION

The field of the present invention relates to communications and, more particularly, to improved preamble and midamble code structures and methods for preamble code detection for use in a communication system.

BACKGROUND

Communication systems typically comprise transmitters and receivers. Both elements are also referred to as stations. A wireless communication, for example, will typically have a number of user stations or "handsets" and a number of base stations, which are capable communicating with each other.

One type of communication used is spread spectrum communication. In spread spectrum communication, a data signal is typically modulated with a pseudo-random chip code to generate a transmitted signal spread over a relatively wide bandwidth. At the receiver, the received spread spectrum signal is despread in order to recover the original data. One method of despreading a spread spectrum signal is by correlating the received signal with a reference code matching the pseudo-noise code used by the transmitter to transmit the data. After initial correlation is achieved, in many systems it is necessary to track the incoming signal so as to maintain synchronization and time-alignment with a local reference code to allow continued despreading of the received signal.

In order to carry out communication between a base station and a user station, a communication link is then established. Establishment of the communication link can be difficult due to the length of time that may be required to synchronize the transmitter and the receiver as well as the relative brevity of the time slot within which synchronization can take place.

In order to assist rapid synchronization of communication in spread spectrum and other communication systems, a preamble preceding an information message or midamble embedded within an information message may be used. Although the disclosure will refer to a preamble as a preferred embodiment, the invention can be used equally well as midambles (e.g., GSM, PCS1900, etc.).

A preamble code may comprise a relatively easily identifiable code sequence that marks the start of the information message and thereby allows the transmitter and receiver to synchronize with one another. The receiver searches for the preamble code and, after locating it, knows when to expect the remaining information message and what timing adjustments may need to be made for optimum correlation of the information message.

The fact that the user stations may be mobile may cause the periodic transmissions to drift within the allocated time slot. In addition, there is the possibility of drift between transmitter and receiver clocks. Thus, the receiver may not know precisely at what point the incoming burst will be received, although in some cases the expected time of arrival may be narrowed down to within a predefined window around the start of the time slot. While the receiver is waiting for its designated message, it may receive extraneous messages from nearby users of the same frequency spectrum or neighboring frequency spectrum, or may otherwise receive interference or noise and mistakenly interpret it as part of the message designated for it. A preamble code helps minimize possible misidentification of noise or interference as a valid message by assisting in the detection of the start of a designated burst. To prevent confusion at the user station, the preamble code for a given user station must be distinguished from the preamble codes as well as any other codes that may be targeted to any other the user station (or to the base station) during a time slot when the given user station is to communicate with the base station.

A preamble code may need to be identified rapidly, such as where a time slot is relatively short. This requirement generally suggests the use of short preamble codes. At the same time, a preamble code is preferably resistant to noise, interference and multipath effects, as well as false alarms due to autocorrelation peaks and cross-correlations, thereby providing a higher probability of proper detection and identification of the preamble code at the receiver. If a preamble code is not properly identified by the receiver, the entire information message for the burst being sent may be lost.

One option to increase likelihood of preamble code detection is to increase the power of the transmitted preamble code over that of the transmit power for the information message, thereby increasing signal-to-noise ratio of the transmitted preamble code. While increasing the transmit power for the preamble code may decrease sensitivity to noise and interference, higher power transmissions for preamble codes may unduly interfere with users of the same or neighboring frequency spectra. Moreover, in certain low power applications (such as various types of handsets), it may not be feasible to increase the transmission power of preamble codes. Even if feasible, increasing transmit power could cause early depletion of battery charge for some mobile handsets.

Another option is to increase the length of the preamble code so as to provide better discrimination as against noise and other signals. However, obtaining long codes with good correlation characteristics is a non-trivial task. Whilst true that longer code lengths can achieve better performance in terms of probability of false alarms and interference rejection, the real novelty resides in the fact that the codes achieve superior aperiodic correlation performance (a very desirable aspect for synchronization codes) for both auto-correlations and cross-correlations. Maximal length linear sequences and Gold codes are examples of sequences that exhibit excellent periodic correlations but often poor aperiodic correlations. These codes also have high intra cross-correlations due the fact that the families consist of shifted versions of the same basic code.

As a further consideration in preamble code design, a preamble code may be used for selection of an antenna channel in a system where antenna diversity is employed. Thus, a preamble code is preferably constructed so as to be well suited for use in a system employing antenna diversity, and to allow relatively easy evaluation of received signal quality so as to facilitate antenna selection.

Accordingly, it would be advantageous to provide a preamble code well suited to a communication system or other communication system requiring rapid synchronization at the receiver. It would further be advantageous to provide such a preamble code while maintaining a relatively simple synchronization filter structure. It would further be advantageous to provide a preamble code having resistance to noise and interference, without necessarily requiring increased transmission power.

SUMMARY OF THE INVENTION

The invention in one aspect comprises in one aspect a synchronization code for use in any communication system, and in another aspect comprises a method for transmitting and receiving the synchronization code in communication systems. The invention comprises a preamble code and synchronizing a receiver in response to the preamble code, thereby establishing communication. Although the code is described herein as a preferred preamble synchronization code, it may also be structured as a midamble code embedded within an information message and thereby synchronize a receiver in response to the midamble code.

The invention preferably comprises two representative sets of seven PN-sequences, or synchronization codes of length 128, which exhibit superior auto-correlation and cross-correlation properties based on linear values representing peak side-lobe levels with respect to the number of chips in agreement during correlation.

Various correlation techniques, such as sliding correlation, are well known in the art. However, as with any correlation procedure, synchronization of correlation signals can take time. Many correlators that encounter a large degree of uncertainty can have impractical correlation times due to, for example, the need to examine many possible code-phase positions. The advantage of the preamble code described herein is that the synchronization times involved in searching through code positions are reasonable for communication systems requiring rapid synchronization and tracking. The preamble codes described herein further offer the advantages of relative ease in implementation since the code sets further offer rapid synchronization for various designs, even including frequency hop synchronization designs.

By establishing threshold signal levels based on preselected threshold levels, average sidelobe energy levels can be evaluated or "scored". Preamble synchronization codes can be selected to fall within the scores and thereby exhibiting the characteristics that provide the advantages discussed above.

The various preamble code structures and means for detection thereof are disclosed with respect to a TDMA communication system, wherein a plurality of user stations communicate with a base station, one in each time slot (or virtual time slot) in time division duplex. However, the preamble provided herein can be employed in any communication system using a preamble or midamble structure code, including CDMA, W-CDMA or FDMA systems.

Other further variations and refinements are also disclosed herein.

DETAILED DESCRIPTION OF THE PREFERRED EMBODIMENTS

Various aspects of the invention, including the different synchronization code structures and means for detecting preamble or midamble codes, are described with reference to a communication system as set forth.

In a first embodiment of the invention, a communication system employs a code set such as Synchronization Code Sets #1 and #2 respectively, provided in Tables 1 and 2 respectively, where peak side lobes (PSLs) are set at levels based on linear values representing peak side-lobe levels with respect to the number of chips in agreement during detection and correlation.

The advantage of the synchronization codes described herein is that the codes are particularly resilient to interference resulting from multipath induced copies of the transmitted sequence for various time delays, as well as interference resulting from adjacent cell utilization of other synchronization codes from the same set. The required synchronization time involved in searching through code positions is not a significant issue for this application.

The codes described herein further offer the advantages of relative ease in implementation since the code sets further offer rapid synchronization even in frequency hop synchronization designs. The PSLs for the synchronization codes disclosed herein are evaluated for full aperiodic shifts (i.e., ±64 shifts) and limited partial shifts (e.g., ±2 and ±10 shifts) and characterized by the maximum number of chips in agreement for those shifts. Note that the PSL scores are constrained by the values provided in Tables 1 and 2.

Code Set #1 consists of a set of seven PN-sequences, or synchronization codes of length 128 (chips) characterized by superior aperiodic auto-correlation properties as provided in Table 1. Code Set #1 may be generated by selectively pairing sequences, obtained via generation polynomials, based on their aperiodic autocorrelation and cross-correlation scores as shown in Table 3. This first embodiment provides receiver synchronization via correlation with a known PN sequence. At the receiver, a processor is preferably used to detect this particular synchronization code.

In a second embodiment of the invention, a communication system may utilize codes from synchronization Code Set #2 in the same manner as Code Set #1. Code Set #2, in turn, consists of a set of seven PN sequences or synchronization codes of length 128 (chips) selected based on their correlation characteristics. The correlation scores for Code Set #2 are provided in Table 4. Code set #2 may be generated by selectively pairing sequences, obtained via an exhaustive search of length 128 (chip) sequences, based on their aperiodic autocorrelation and cross-correlation scores.

The second embodiment of the invention also provides receiver synchronization via correlation with a known PN sequence. At the receiver, a processor is preferably used to detect this particular synchronization preamble code.

Table 1, provided below, is a listing of the family of codes each of sequence 128 known as Synchronization Code Set #1:

TABLE 1

Synchronization Code Set #1

Preamble Code #1:

11000111011000101001011111010101000010110111100111001010110011000001101101011101000110010001000000100100110100111101110000111111

Preamble Code #2:

10010101010110010000010000010111111101110000110001111001000011111101111001010110101100110010100011011101011110000001101100010001

Preamble Code #3:

10100101101110100011100100000110100000001110101010110001000100101000001011101010111001000100111101011110011101100101100111101101

Preamble Code #4:

11110010000101001111010101011100000110001010110011001011111101111001101110111001010010100010010110100011001110011110001101100

Preamble Code #5:

11001000010011000110101010000010001000010011000011100101110101001100011011101010010101111001000101101111110111101001000011001

Preamble Code #6:

01110011011000110101001000011001100000101001110000110110111111100101000000010001101110111010101001110101001100100100101011

Preamble Code #7:

0111000100001101001011110101001000111010101000110111000010100010010111111010010110111111101101101110100011100101111111000000110

Table 2 provided below, is a listing of the family of codes each of sequence 128 known as Synchronization Code Set #2:

TABLE 2

Synchronization Code Set #2

Preamble Code #1:

01010011000000100111100111100011101111101011011010010000011111101000100010101101100100100011000100010100000111010011110011011100111

Preamble Code #2:

00111001000100000101110110001101000101001101100001010010000110111011011001101101001101011010101111000011110000111111011110101001

Preamble Code #3:

0110011001001001010001010111011010000011010001001000000101100011100110101111110100111001011110101000011011010111101110000111001

Preamble Code #4:

0010110100101011100111000100010100001101011110011111001010111101011000001010110001001000001111100110110011001100010011111010101001

Preamble Code #5:

01010001101111100000010010110000000010100011000001110100101111111000101000110011011101011011101011101011101111000010111100011

Preamble Code #6:

010011101010001101001100101000011101000000000111010100001001000011101111100010111011100111111011110001111100011100100110110011001

Preamble Code #7:

010110111010110111000111110010110001101111110010000011101001001101011110101111011001000001000100101010010011101000101010010010

TABLE 3

Autocorrelation and Cross-Correlation Scores for Synchronization Code Set #1

| | Autocorrelation Score (chips) | | | Cross-correlation Score (Chips) | |
|---|---|---|---|---|---|
| Code # | PSL(±64) | PSL(±2) | PSL(±10) | PSL(±64) | PSL(±0) |
| 1 | 12 | 2 | 6 | 31 | 24 |
| 2 | 21 | 6 | 11 | 31 | 18 |
| 3 | 30 | 11 | 11 | 28 | 22 |
| 4 | 16 | 7 | 11 | 31 | 16 |
| 5 | 19 | 9 | 15 | 31 | 14 |
| 6 | 30 | 8 | 16 | 29 | 24 |
| 7 | 20 | 14 | 14 | 28 | 22 |

TABLE 4

Autocorrelation and Cross-Correlation Scores for Synchronization Code Set #2

| | Autocorrelation Score (Chips) | | | Cross-correlation Score (Chips) | |
|---|---|---|---|---|---|
| Code # | PSL(±64) | PSL(±2) | PSL(±10) | PSL(±64) | PSL(±0) |
| 1 | 11 | 2 | 6 | 27 | 8 |
| 2 | 13 | 8 | 11 | 28 | 12 |
| 3 | 13 | 7 | 8 | 28 | 12 |
| 4 | 13 | 7 | 10 | 29 | 14 |
| 5 | 13 | 12 | 13 | 29 | 14 |
| 6 | 13 | 5 | 13 | 29 | 16 |
| 7 | 13 | 13 | 13 | 29 | 16 |

Figure 1:
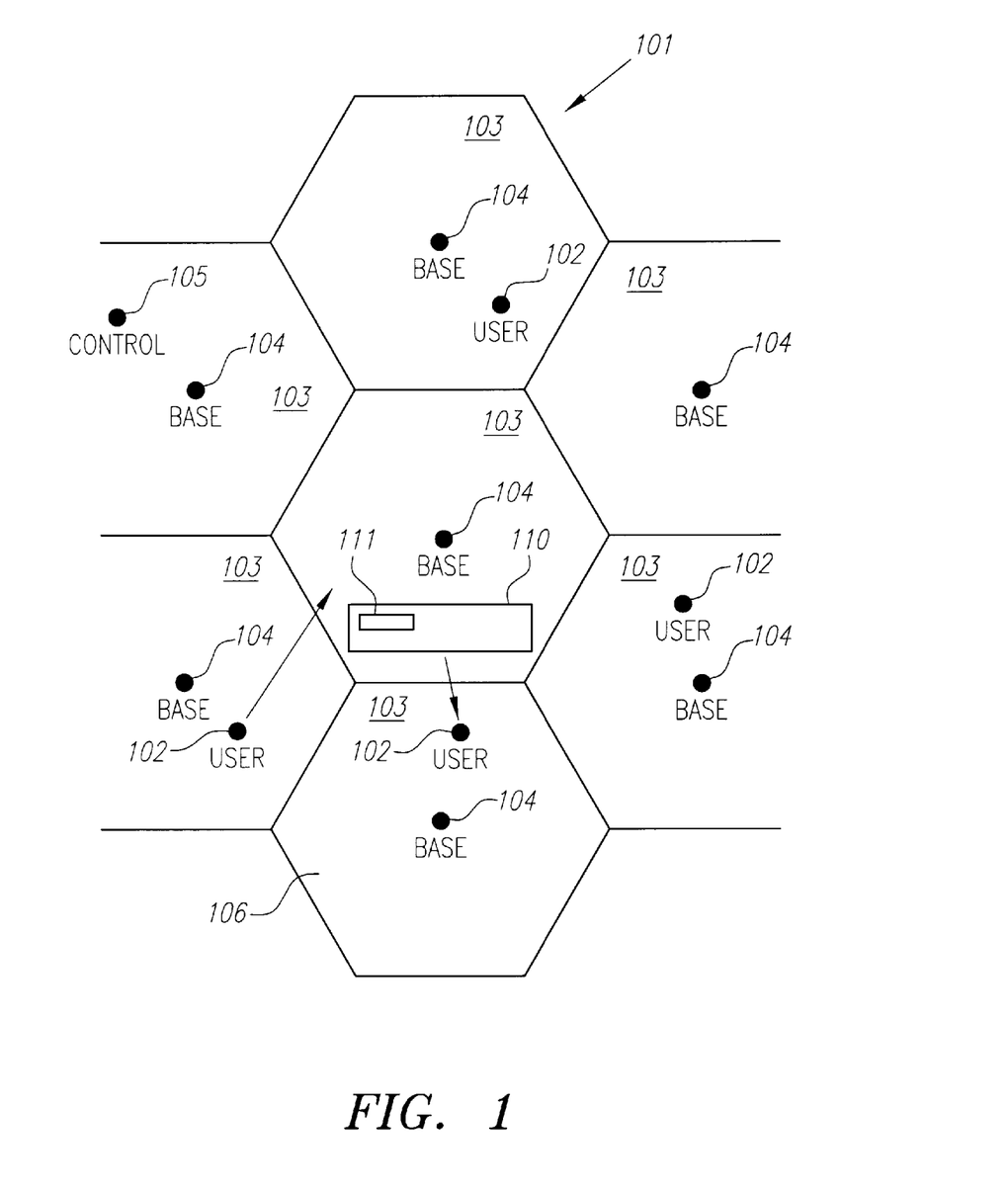
FIG. 1 provides a representation of a sample communication system.

FIG. 1 illustrates the cellular arrangement of a typical communication system 101 comprising one or more user stations 102 and one or more base stations 104 arranged within a plurality of communication cells 103 where a preamble code preceding an information message may be used to assist rapid synchronization of communication in spread spectrum or other techniques. Further details related to the features, performance and characteristics of an exemplary communication network along with design and implementation considerations are further provided in co-pending U.S. patent application Ser. No. 08/749,885, hereby incorporated herein by reference as if fully set forth herein.

Each base station 104 and user station 102 preferably comprises one or more radios each comprising a receiver, a transmitter, and one or more antennas. Each cell 103 preferably includes a single base station 104 located near the center of the cell 103.

Figure 2:
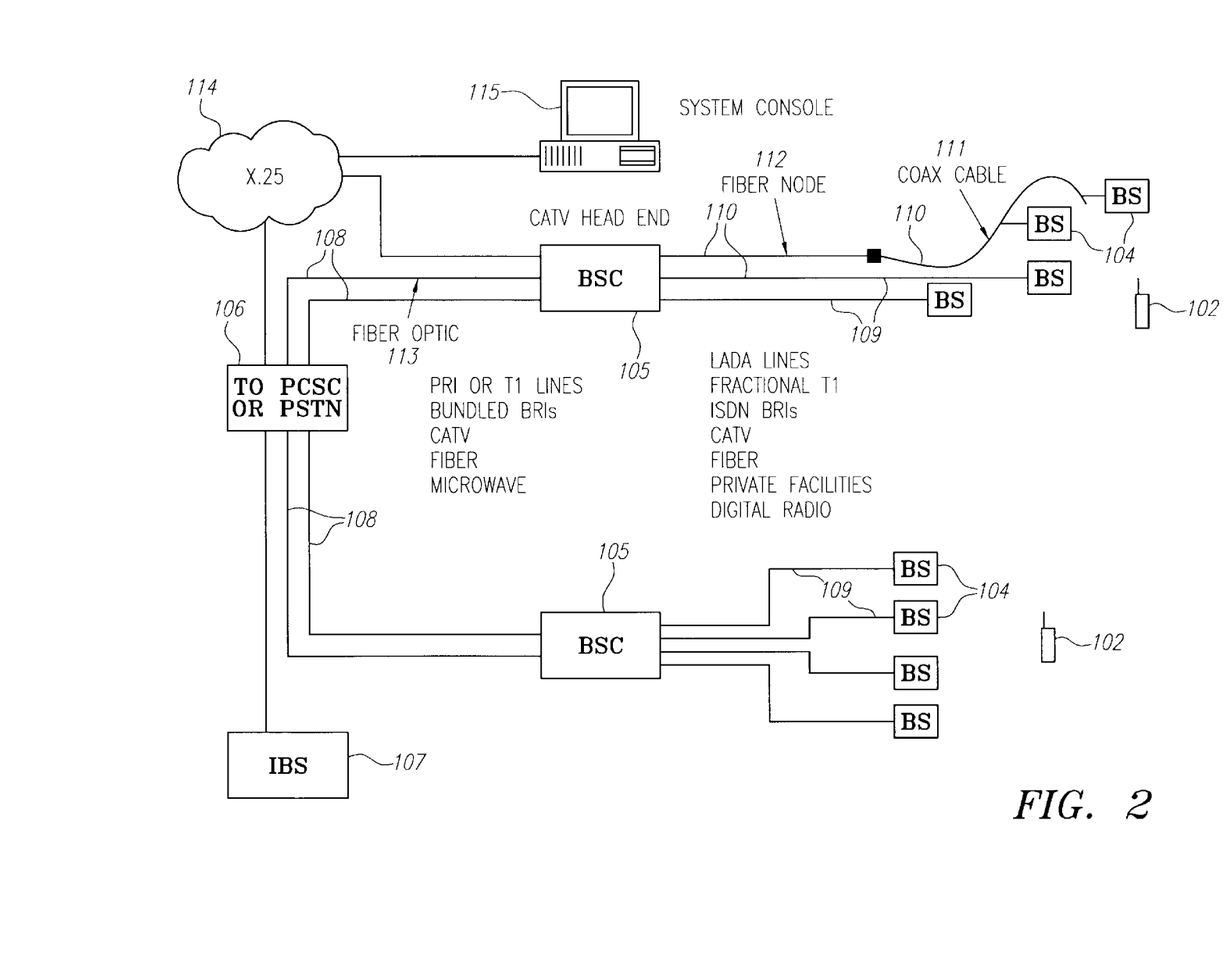
FIG. 2 provides additional details of a sample communication system architecture.

FIG. 2 provides additional details of sample communication system architecture 101. The system architecture includes a plurality of base stations 104 which communicate with a plurality of user stations 102. Each base station 104 is shown coupled to a base station controller 105 by any of a variety of communication paths 109. The communication paths 109 each comprise one or more communication links 110. Each base station controller 105 is preferably connected to one or more communication networks 106 such as a public switched telephone network (PSTN) or personal communication system switching center (PCSC). Each base station controller 105 is shown connected to the communication network(s) 106 by means of one or more communication paths 108, each of which may include one or more communication links 110, examples of which are explained above.

Figure 3:
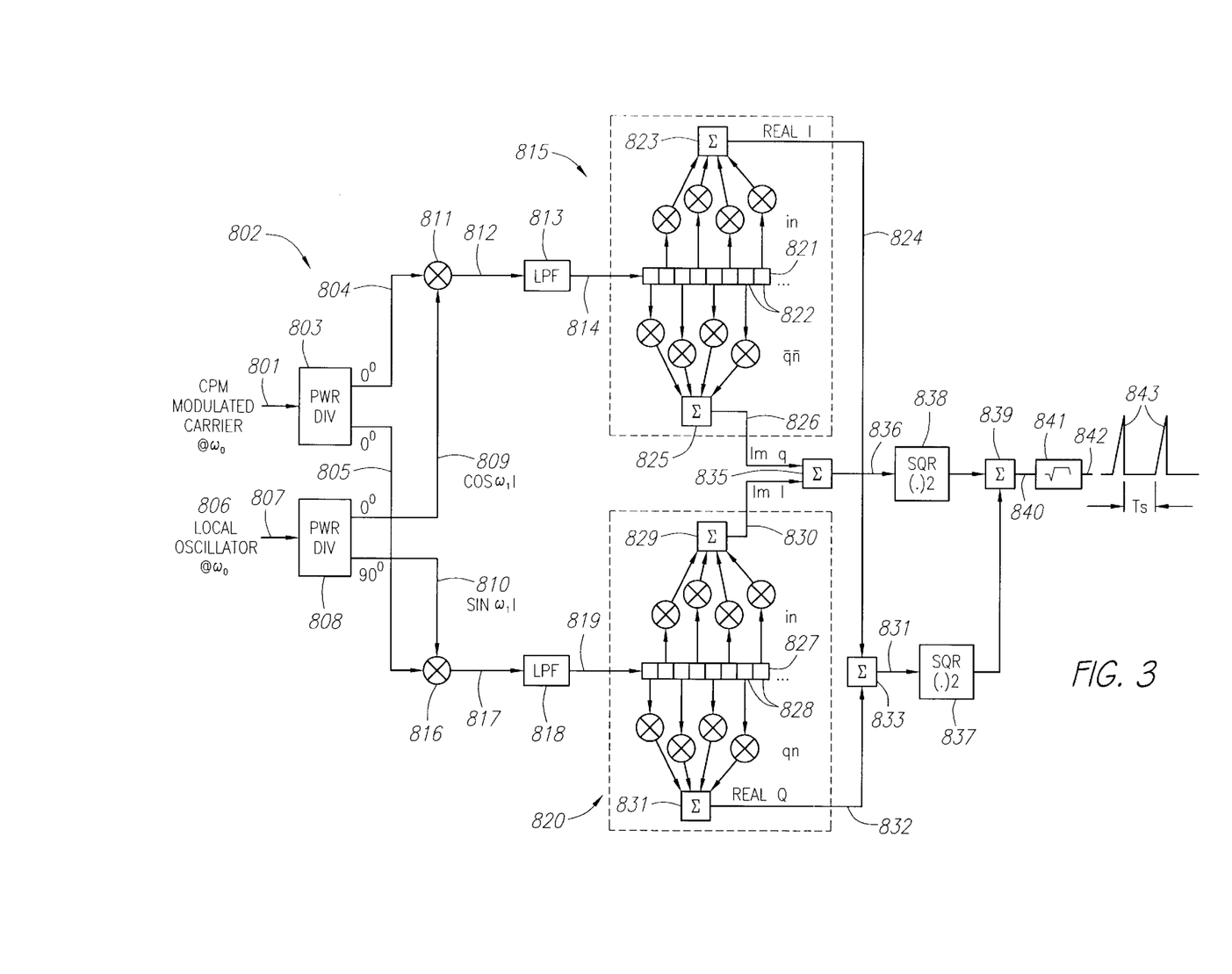
FIG. 3 provides a circuit diagram of a sample corrector that may be used for detecting the preamble code.

In one embodiment, communication between base stations 104 and user stations 102 is accomplished using spread spectrum technology. FIG. 3 is a circuit diagram of a sample non-coherent continuous phase modulated (CPM) correlator that may be used for detecting the preamble code. The operation of the FIG. 3 circuit is more fully described in U.S. Pat. No. 5,569,574 which is assigned to the assignee of the present invention and which is incorporated herein by reference as if fully set forth herein. Other exemplary correlators are described in U.S. Pat. Nos. 5,022,047 and 5,016,255, each of which are assigned to the assignee of the present invention, and each of which are incorporated herein by reference as if fully set forth herein.

Figure 4A:
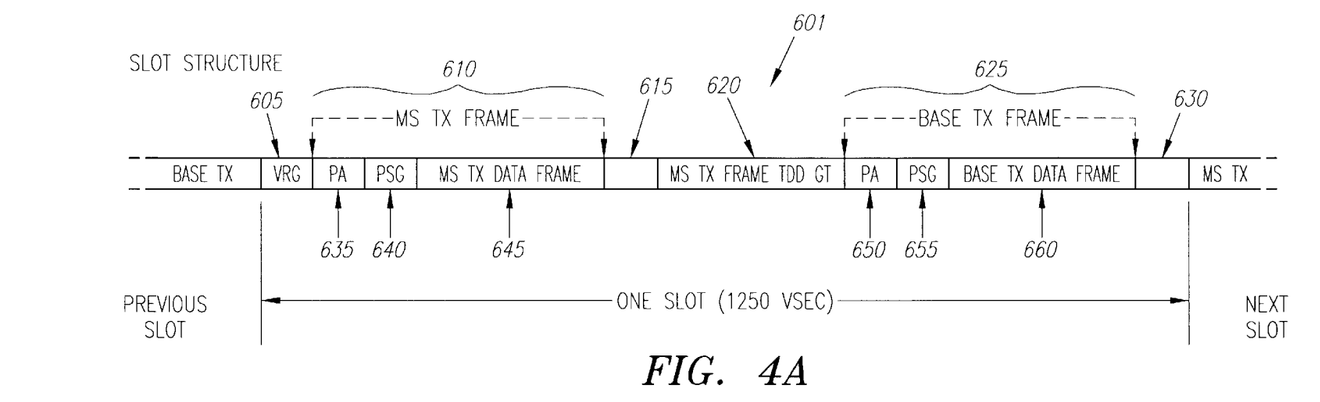
FIGS. 4(A)–4(C) shows the structure of a sample time slot.
Figure 4B:
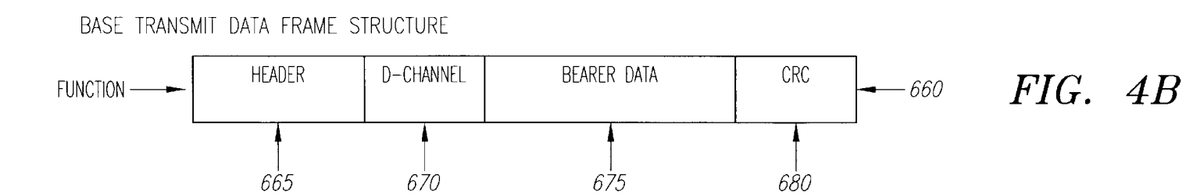
Figure 4C:
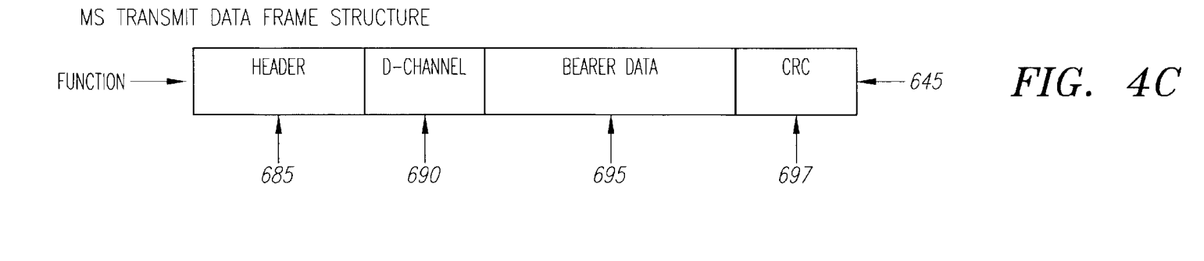

FIG. 4 shows the structure of a typical structure of a time slot 601 that may be used during transmission of a preamble code. Time slot 601 may comprise a variable radio delay gap 605, a user station transmit field 610, a base processor gap 615, a guard time 620, a base transmit field 625, and a radar gap 630. Each user station transmit field 610 may comprise a user preamble code field 635, a user preamble sounding gap 640, and a user station data field 645. Similarly, each base transmit frame 625 comprises a base preamble code field 650, a base preamble sounding gap 655, and a base transmit data field 660. The user preamble code field 635 and base preamble code field 650 are illustrated in more detail in a variety of different embodiments described later herein.

Several embodiments of the invention make use of one or more matched filter(s) and/or one or more mismatched filter(s). Matched filters for spread-spectrum communication (including M-ary spread spectrum communication) are known in the art as exemplified by, e.g., U.S. Pat. Nos. 5,022,047 and 5,016,255, both of which are assigned to the assignee of the present invention and incorporated by reference as if fully set forth herein. A variety of other types of correlators and/or matched filters are known in the art and would be suitable in various embodiments of the invention set forth herein. Selection of a suitable correlator depends on a variety of factors, including the type of modulation used to transmit the signal to be detected.

The construction of mismatched filters, including derivation of appropriate filter coefficients, is well known in the art of signal detection. Appropriate coefficients for a mismatched filter to detect a code may be determined by using, for example, a simplex method or gradient method. Optimizing computer programs are also available to assist in derivation of suitable filter coefficients. The mismatched filter may be constructed to operate in either an analog fashion or a digital fashion. Generally, the mismatched filter coefficients may have as values any real or complex number.

The length selected for the mismatched filter and the number of non-zero coefficients will in part be a function of how much processing time is available to arrive at a correlation result.

Sample synchronization code structures will now be described. In one aspect of the present invention, the preamble code preceding the message (or embedded within the message) can be a code formed by combining several other subcodes in a specified manner.

To generate a family of preamble codes, a plurality of short codes with favorable aperiodic autocorrelation responses and low aperiodic cross-correlation may be used. The ultimate performance of a communication system may be enhanced in part upon selection of the subcodes as provided in Tables 1 and 2.

In order to allow more flexibility in base code selection without having an unacceptable increase in sidelobe growth, mismatched filters may be used to process the preamble codes, although with some (usually very small) loss in processing gain against noise.

Although preamble codes have been discussed in terms of "chips" so as generally to relate the preamble codes to a preferred spread spectrum communication system; any binary elements may be used instead of chips to construct preamble codes in accordance with the techniques disclosed herein.

What is claimed is:

1. A method of communicating comprising the steps of:
transmitting a synchronization code from a first station to a second station, said synchronization code of length 128 and said synchronization code exhibiting autocorrelation and cross-correlation scores said scores being linear value representations of peak side-lobe levels with respect to the number of chips in agreement, said scores evaluated at peak side lobe levels, said autocorrelation scores for peak side lobe levels for full aperiodic code shifts evaluated at ±64 being between 12 and 30, said autocorrelation scores for peak side lobe levels at ±2 being between 2 and 14, said autocorrelation scores for peak side lobe levels at ±2 being between 6 and 16, said cross-correlation scores for peak side lobe levels at ±64 being between 28 and 31 and said cross-correlation scores for peak side lobe levels at ±0 being between 14 and 24; and
receiving said synchronization code at said second station;
synchronizing a receiver at said second station in response to said synchronization code;
transmitting a data message from said first station to said second station; and
receiving said data message at said second station.

2. The method of claim 1 wherein said synchronization code is a member of a code family selected from the group of code families consisting of Synchronization Code Set #1.

3. The method of claim 1 wherein said synchronization code is the sequence:
11000111011000101001011111010101000010110111110-0111001010110011000001101101-01011101000110010001000000100100110100111101-110000111111.

4. The method of claim 1 wherein said synchronization code is the sequence:
100101010101100100000100000101111111011100011-0001111001000011111011110-010101101011001100101000110111010111100000011-101100010001.

5. The method of claim 1 wherein said synchronization code is the sequence:
1010010110111010001110010000011010000000111010-101011000100010010100000100-11101010111001000100111101011110011101100101-100011110110.

6. The method of claim 1 wherein said synchronization code is the sequence:
11110010000101001111101010101110000011000101011-1001100101111110111001101-110111001010100101000100101101001011001110011-11000110110100.

7. The method of claim 1 wherein said synchronization code is the sequence:
11001000010011000110101010000010001000010010110-000111001011101010100110001-10111011010010101110010001011011111101111101-001000011001.

8. The method of claim 1 wherein said synchronization code is the sequence:
01110011101100011010100100001100110000010100111-1000011011011111111110010100-000001000110111011101010100111010100110010011-001010011011.

9. The method of claim 1 wherein said synchronization code is the sequence:
01110001000011010010111101010010001110101010100-0110111000010100010010111111-11010010110111111110110110111010001110010111-111100000110.

10. A method of communicating comprising the steps of:
transmitting a synchronization code from a first station to a second station, said synchronization code of length 128 and said synchronization code exhibiting autocorrelation and cross-correlation scores; said scores being linear value representations of peak side-lobe levels with respect to the number of chips in agreement, said scores evaluated at peak side lobe levels, said autocorrelation scores for peak side lobe levels for fill aperiodic code shifts evaluated at ±64 being between 11 and 13, said autocorrelation scores for peak side lobe levels at ±2 being between 2 and 13, said autocorrelation scores for peak side lobe levels at ±10 being between 6 and 13, said cross-correlation scores for peak side lobe levels at ±64 being between 27 and 29 and said cross-correlation scores for peak side lobe levels at ±0 being between 8 and 16; and
receiving said synchronization code at said second station;
synchronizing a receiver at said second station in response to said synchronization code;
transmitting a data message from said first station to said second station; and
receiving said data message at said second station.

11. The method of claim 10 wherein said synchronization code is a member of a code family selected from the group of code families consisting of Synchronization Code Set #2.

12. The method of claim 10 wherein said synchronization code is the sequence:
01010011000000100111100111100011101111010110-1010010000111111010001010-101101100100100011000100010100000111010100111-1001101110011.

13. The method of claim 10 wherein said synchronization code is the sequence:
00111001000100000101110110001101000101001011-000010100110001101110110110-01101101001101011010101110000111100001111110-111101010001.

14. The method of claim 10 wherein said synchronization code is the sequence:
01100110010010010100010101110110100000110100 0-10010000001011000111001010101-11111101001110010111110101000011011010111101-110000111001.

15. The method of claim 10 wherein said synchronization code is the sequence:
00101101001010111001110001000101000011010111-1001111001010111101011000000-101011000100100000111110011011001100110001000-111110101001.

16. The method of claim 10 wherein said synchronization code is the sequence:
0101000110111110000001001011000000001010001100-00011101001011111111000101000

01100110111010110110111010111010111010111000-
010111100011.

17. The method of claim 10 wherein said synchronization code is the sequence:
01001110101000110100110010100001110100000000-
0111010100010010000111101111
1000101110110011111101110001111110011100 1001-
101001101001.

18. The method of claim 10 wherein said synchronization code is the sequence:
01011011101011011100011111001011000110111111 10-
01000001110100100110101111
01011110110010000010001001010100100111 01000-
1010100010010.

19. A communication system comprising a first station and a second station wherein communication between said first station and said second station uses a synchronization code, said synchronization code selected from a group consisting of Synchronization Code Set #1 wherein said synchronization code is a sequence of length 128.

20. The communication system of claim 19 comprising a plurality of first stations and a plurality of second stations.

21. A communication system comprising a first station and a second station wherein communication between said first station and said second station uses a synchronization code, said synchronization code selected from a group consisting of Synchronization Code Set #2 wherein said synchronization code is a sequence of length 128.

22. The communication system of claim 21 comprising a plurality of first stations and a plurality of second stations.

23. A method for communicating comprising the steps of:

defining a first synchronization code, said first synchronization code selected from Synchronization Code Set #1 or Synchronization Code Set #2;

defining a second synchronization code, said second synchronization code selected from Synchronization Code Set #1 or Synchronization Code Set #2, wherein said first synchronization code and said second synchronization code have the same length;

transmitting said first synchronization code from a first station to a second station;

transmitting a first data message following said first synchronization code from said first station to said second station;

receiving said first preamble code at said second station and synchronizing thereto;

receiving said first data message at said second station;

transmitting said second synchronization code from a third station to a fourth station;

transmitting a second data message following said second synchronization code from said third station to said fourth station;

receiving said second synchronization code at said fourth station and synchronizing thereto; and receiving said second data message at said second station.

\* \* \* \* \*